United States Patent [19]
Flick et al.

[11] Patent Number: 5,206,801
[45] Date of Patent: Apr. 27, 1993

[54] AC/DC CONVERTER FAULT DETECTOR

[76] Inventors: John R. Flick, 3427 Lauderdale La., Rockford, Ill. 61107; Cecil W. Sims, 782 Timber Ridge Trail, Rockford, Ill. 61111

[21] Appl. No.: 761,455

[22] Filed: Sep. 18, 1991

[51] Int. Cl.[5] .................................. H02M 7/125
[52] U.S. Cl. ........................... 363/53; 363/126
[58] Field of Search ............... 363/52, 53, 54, 125, 363/126

[56] References Cited

U.S. PATENT DOCUMENTS

| | | | |
|---|---|---|---|
| 3,848,175 | 11/1974 | Demarest | 363/54 |
| 4,016,468 | 4/1977 | Graf | 363/54 |
| 4,150,325 | 4/1979 | Miller et al. | 363/54 |
| 4,186,391 | 1/1980 | Wang et al. | 340/645 |
| 4,218,728 | 8/1980 | Chambers et al. | 363/54 |
| 4,376,968 | 3/1983 | Wueschinski et al. | 363/54 |
| 4,559,486 | 12/1985 | Spencer et al. | 322/99 |
| 4,620,272 | 10/1986 | Fulton et al. | 363/126 |
| 4,725,941 | 2/1988 | Watanabe | 363/54 |
| 4,815,052 | 3/1989 | Walker | 363/54 |
| 5,099,409 | 3/1992 | Bando et al. | 363/54 |

Primary Examiner—R. Skudy
Assistant Examiner—Jeffrey Sterrett
Attorney, Agent, or Firm—Marshall, O'Toole, Gerstein, Murray & Bicknell

[57] ABSTRACT

A system is disclosed including an AC sensor for providing an AC sensor signal based upon AC on AC lines, a DC sensor for providing a DC sensor signal based upon DC, and a fault detector for providing a fault indicating signal based upon a difference between the AC sensor signal and the DC sensor signal.

18 Claims, 6 Drawing Sheets

AC/DC CONVERTER FAULT DETECTOR

BACKGROUND OF THE INVENTION

The present invention relates to the detection of faults in electrical circuits and, more particularly, to the detection of faults in circuits which have both AC and DC sections.

Detection of faults in electrical and/or electronic circuits is becoming increasingly important in many applications, especially in those applications where faults can have severe results. For example, failure to detect a fault in the electrical power generation equipment on board aircraft may result in more complex and expensive power generation systems and damage to the electrical utilization loads on board the aircraft. It is advantageous, therefore, to detect faults whether they occur in the electrical power generation apparatus itself or in other elements of the electrical system.

The electrical power generation system of an aircraft typically includes an alternator or generator driven by a prime mover such as an engine of an aircraft. The output of the generator or alternator is connected through a rectifying bridge in order to convert the AC supplied by the generator or alternator into DC. This DC can be used directly by the DC loads of the aircraft and can also be inverted into constant frequency AC for supply to the aircraft's AC loads. One of the most common faults in electrical power generation equipment of this type is a short of one of the diodes in the AC to DC converter. A shorted diode in the AC to DC converter can introduce AC onto the DC load bus resulting in damage to the DC loads. A shorted diode can also result in high phase currents from the generator or alternator which can potentially cause further damage to the AC to DC converter, low line-to-line AC voltage, and a high DC ripple voltage to the DC to AC inverter which can cause the inverter to produce harmonics requiring heavy and expensive harmonic filters. These consequences make it necessary to detect and disconnect a rectifier bridge with a shorted diode in as short a time as possible. Preferably, the sensing circuit should react in less time than the switching time of the switch which disconnects the converter from the DC bus in response to the sensing circuit.

Measuring the output of the converter alone may be insufficient in order to detect a fault in the converter. For example, a shorted diode in the converter may result either in relatively little change in the magnitude of the DC output from the converter or in a decrease in DC current which could have resulted from changing load conditions instead of a fault in the AC to DC converter. Therefore, it is necessary to sense parameters involved in the conversion of AC into DC which will provide a useful indication of a fault in a converter.

SUMMARY OF THE INVENTION

The present invention avoids the problems associated with sensing only the output of the AC to DC converter by sensing and comparing both the AC input to and DC output from the converter in order to produce an indication as to whether or not there's a fault in the converter.

Accordingly, the invention involves a system which includes an AC sensor for providing an AC sensor signal based upon AC on AC lines, a DC sensor for providing a DC sensor signal based upon DC, and a fault detector for providing a fault indicating signal based upon a difference between the AC sensor signal and the DC sensor signal.

More particularly, the invention includes an AC sensor for providing an AC sensor signal based upon AC supplied to an AC to DC converter, a DC sensor for providing a DC sensor signal based upon the DC output from an AC to DC converter, and a fault detector for providing a fault indicating signal based upon the AC sensor signal and the DC sensor signal.

The present invention can be used in a three phase system in which an AC sensor provides an AC sensor signal based upon three phase AC supplied to an AC to DC converter which converts three phase AC into DC, a DC sensor for providing a DC sensor signal based upon the DC supplied by the AC to DC converter, and a fault detector for providing a fault indicating signal based upon the AC sensor signal and DC sensor signal.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
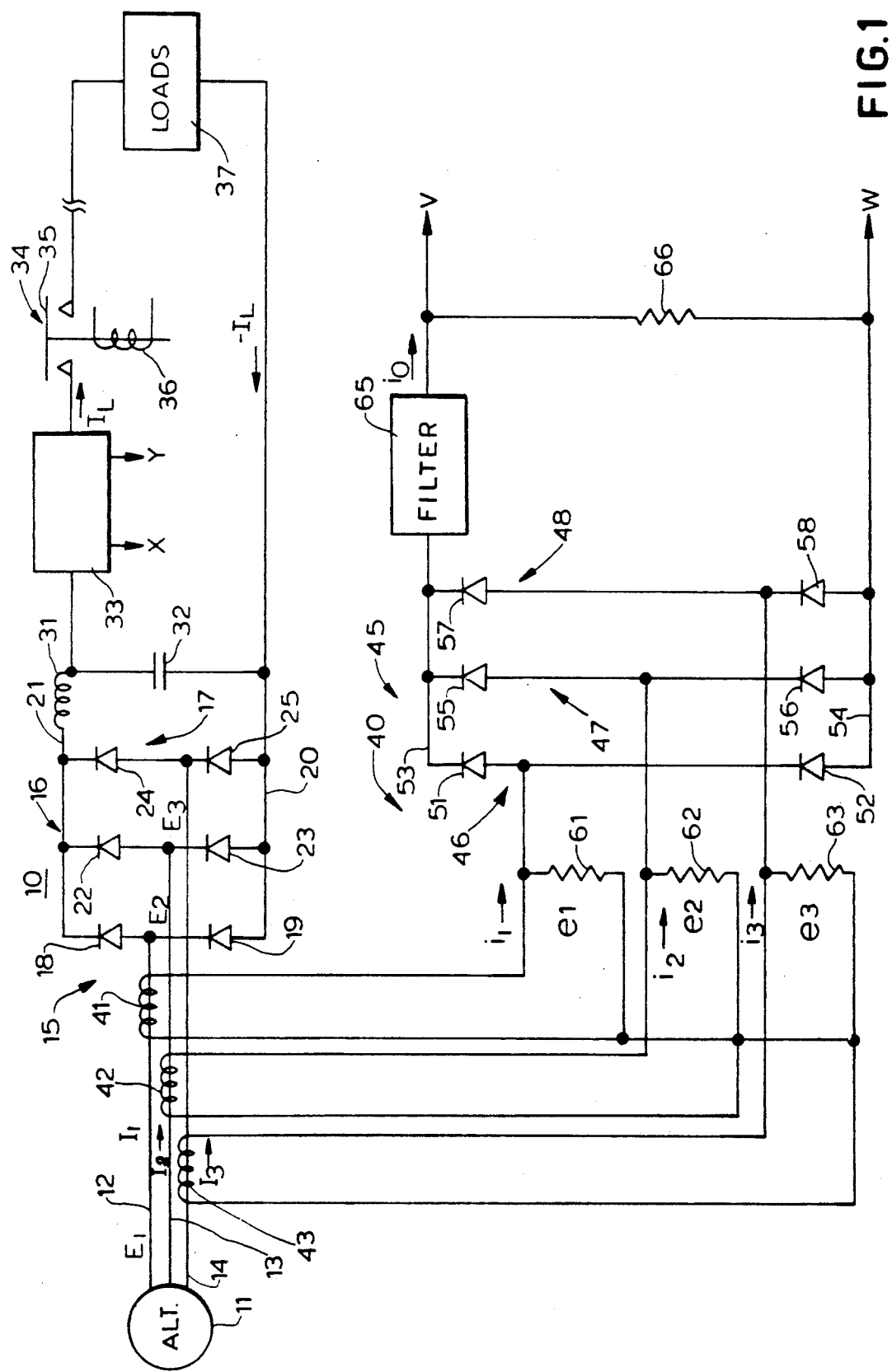
FIG. 1 is a schematic diagram showing the AC to DC converter, the AC sensor for sensing the AC input to the AC to DC converter, and the DC sensor for sensing the DC output from the AC to DC converter according to the present invention.

As shown in FIG. 1, alternator 11 supplies three phase AC over three phase lines 12, 13, and 14. First phase line 12 is connected to a first rectifier branch 15 of AC to DC converter 10, second phase line 13 is connected to a second rectifier branch 16 of AC to DC converter 10, and third phase line 14 is connected to a third rectifier branch 17 of AC to DC converter 10. First rectifier branch 15 includes diodes 18 and 19 connected in series from negative DC line 20 to positive DC line 21. First phase line 12 is connected to the junction of diodes 18 and 19. Second rectifier branch 16 includes diodes 22 and 23 connected in series from negative DC line 20 to positive DC line 21. Second phase AC line 13 is connected to the junction of diodes 22 and 23. Third rectifier branch 17 includes diodes 24 and 25 connected in series from negative DC line 20 to positive DC line 21. Third phase AC line 14 is connected to the junction of diodes 24 and 25. The diodes of AC to DC converter 10 are arranged to provide positive DC on line 21 and negative DC on line 20. AC to DC converter 10 also includes a filter having inductor 31 and capacitor 32 connected in series from positive DC line 21 to negative DC line 20. This filter filters out AC ripple on the DC output from AC to DC converter 10. Sensor 33 is coupled between the junction of inductor 31 and capacitor 32 and contactor 34 in order to sense the DC output current from AC to DC converter 10. This sensor may be a shunt, a transductor, a Hall effect device, or a magneto optic current sensor, or the like.

Sensor 33 will produce a voltage at its output terminals X and Y which is proportional to the current $I_L$ which is the direct current output from AC to DC converter 10.

Contactor 34 has a movable contact 35 for bridging a pair of stationary contacts when the contact coil 36 is energized. Loads 37 receive the DC output from AC to DC converter 10. These loads may be DC loads and/or a DC to AC inverter for inverting the DC into AC for supply to AC loads.

AC sensor 40 senses the AC supplied to AC to DC converter 10 by alternator 11. AC sensor 40 includes current transformer 41 for sensing the current in first phase line 12, current transformer 42 for sensing the current in second phase line 13, and current transformer 43 for sensing the current in third phase line 14. AC sensor 40 also includes rectifying bridge 45 having three rectifier branches 46, 47, and 48, each of which is connected to a respective current transformer. Accordingly, rectifier branch 46 includes a pair of series-connected diodes 51 and 52 connected between positive AC sensing line 53 and negative AC sensing line 54. The junction of diodes 51 and 52 is connected to one side of current transformer 41. Rectifier branch 47 includes series-connected diodes 55 and 56 connected between positive AC sensing line 53 and negative AC sensing line 54. The junction of diodes 55 and 56 is connected to one side of current transformer 42. Rectifier branch 48 includes series-connected diodes 57 and 58 connected between positive AC sensing line 53 and negative AC sensing line 54. The junction of diodes 57 and 58 is connected to one side of current transformer 43. The second sides of current transformers 41, 42, and 43 are connected together. Resistor 61 is connected across current transformer 41, resistor 62 is connected across current transformer 42, and resistor 63 is connected across current transformer 43. AC rectifier bridge 45 also includes filter 65 arranged to filter out AC components in the DC signal on line 53 which is supplied to output terminal V. Negative AC sensing line 54 is connected to terminal W. Resistor 66 is connected across terminals V and W.

Figure 2:
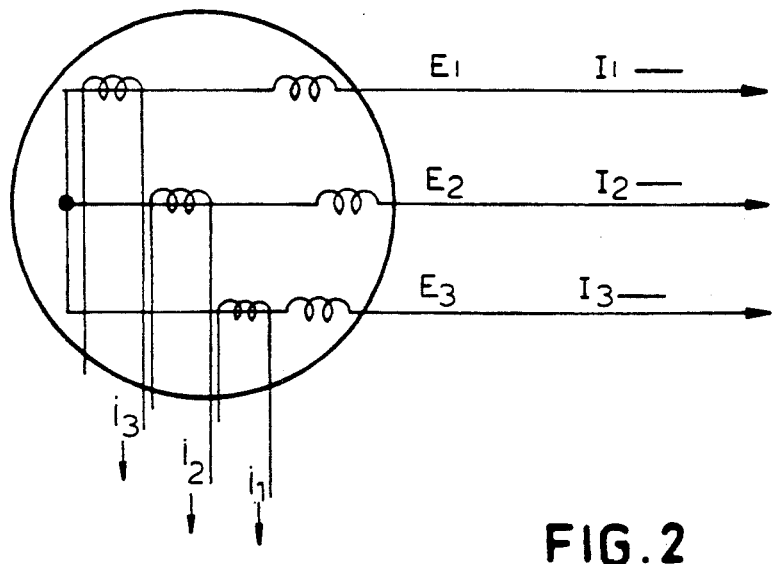
FIG. 2 shows an alternate current sensing arrangement which can be used as the AC sensor shown in FIG. 1.

If a generator is used in place of alternator 11, the current transformer assembly can be located in the generator phase neutrals as shown in FIG. 2 and thus include the generator, feeders, and converter in the differential zone.

Figure 3:
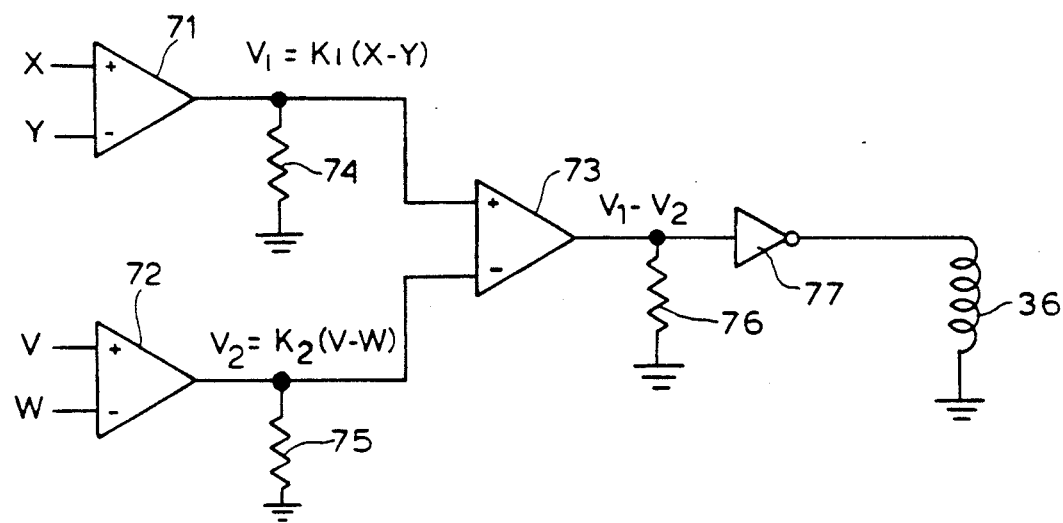
FIG. 3 illustrates the fault detector for use in conjunction with the sensing circuit shown in FIG. 1.

The outputs X and Y of DC sensor 33 are connected to a first differential amplifier 71 as shown in FIG. 3 with the positive output X connected to the noninverting input of differential amplifier 71 and the negative output Y connected to the inverting input of amplifier 71. Similarly, the positive terminal V from AC sensor 40 is connected to the noninverting input of differential amplifier 72 and the negative terminal W is connected to the inverting input of amplifier 72. The output of differential amplifier 71 provides an output $V_1$ which is proportional to the difference between its inputs X and Y. The output of differential amplifier 71 is connected to a reference potential such as ground through resistor 74 and is also connected to the noninverting input of differential amplifier 73. The output of differential amplifier 72 provides an output $V_2$ which is proportional to the difference between its inputs V and W. The output of differential amplifier 72 is connected to a reference potential such as ground through resistor 75 and is also connected to the inverting input of amplifier 73. The output of differential amplifier 73 is the difference between voltages $V_1$ and $V_2$. This output is connected to ground through resistor 76 and is also connected to ground through inverter 77 and contactor coil 36. Resistors 61, 62, 63, 66, 74, 75, and 76 and current transformers 41, 42, and 43 are arranged so that, for a normally operating AC to DC converter, the inputs to differential amplifier 73 will be equal such that the output from differential amplifier 73 will be zero and the output from inverter 77 will be high energizing coil 36 to maintain contactor 34 closed in order to supply DC power to DC loads 37. If the output from differential amplifier 73 deviates sufficiently from zero, the output from inverter 73 changes sufficiently to drive the output from inverter 77 low to de-energize coil 36 and allow contactor 34 to open to in turn isolate the DC loads 37 from the AC to DC converter.

Figure 4:
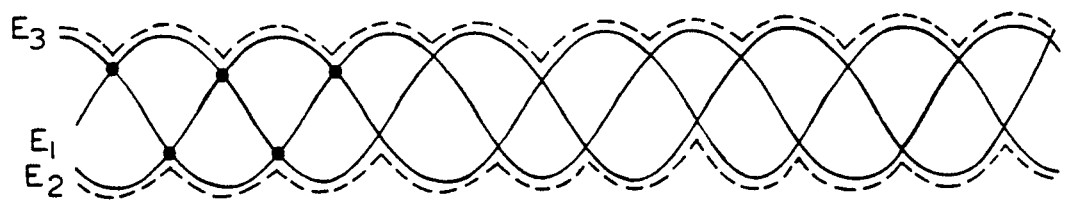
FIGS. 4–16 illustrate the waveforms at various points in the circuit of FIG. 1, both before and after a fault in the AC to DC converter.
Figure 5:
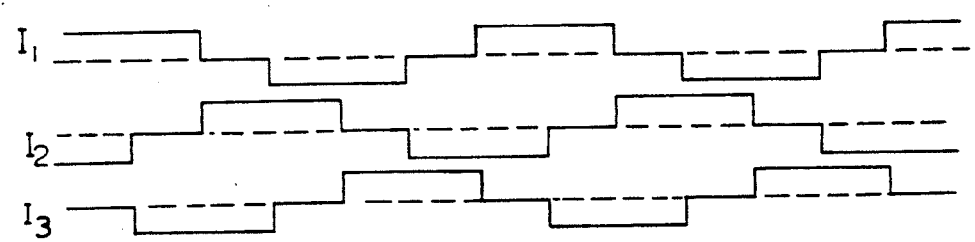
Figure 6:
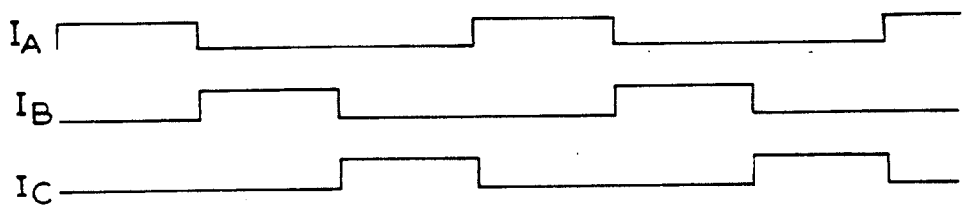
Figure 7:
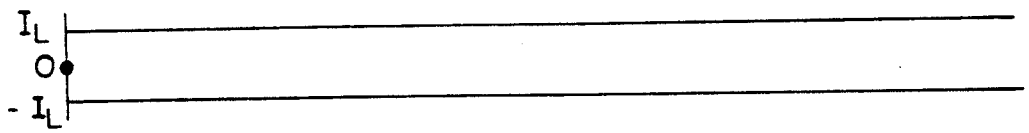
Figure 8:
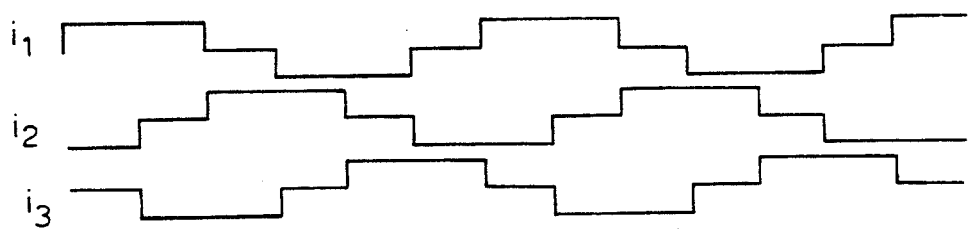
Figure 9:
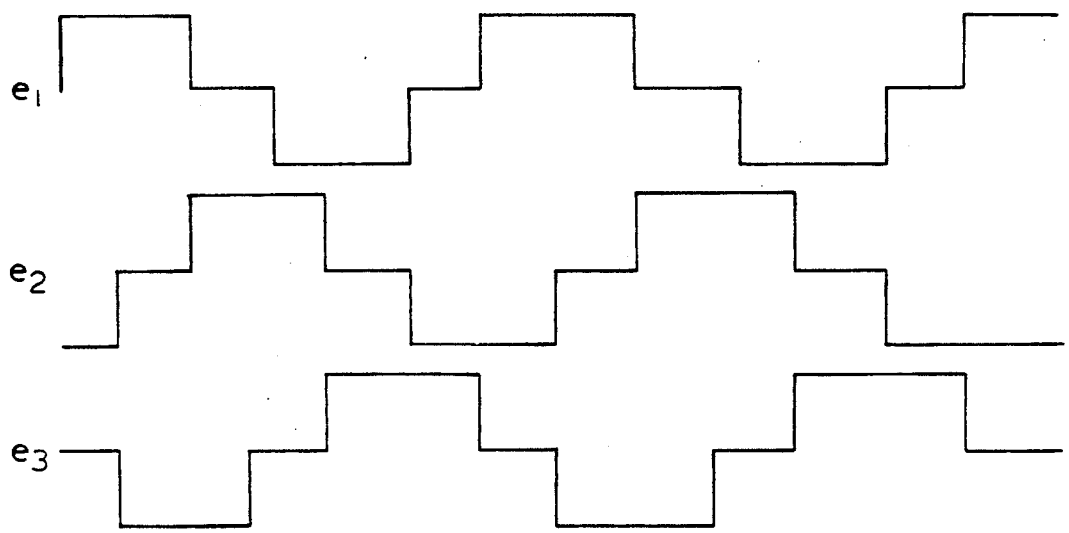
Figure 10:
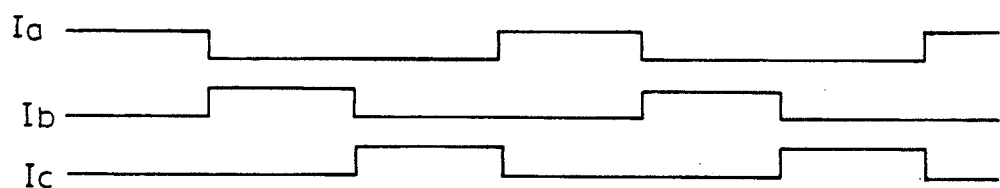
Figure 11:
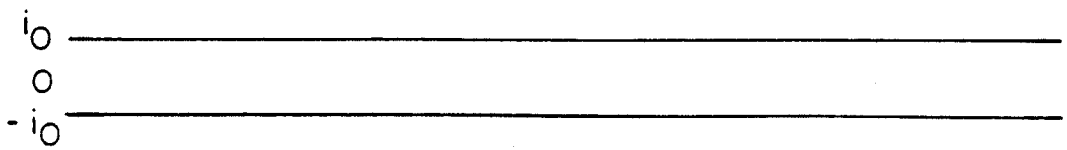

FIGS. 4-11 show the system signals when AC to DC converter 10 is functioning properly. FIG. 4 illustrates the three phase-to-neutral voltages generated by the alternator 11 and applied to the input terminals of AC to DC converter 10. FIG. 5 illustrates the currents in each of the phase lines 12, 13, and 14 which are supplied to AC to DC converter 10 ignoring commutation and assuming continuous conduction. FIG. 6 illustrates the current flow through the positive rectifiers of rectifying branches 15, 16, and 17 of AC to DC converter 10. FIG. 7 illustrates the output current from AC to DC converter 10 with the positive current representing the positive rectifier components and the return current representing the negative rectifier components. The output of current transformers 41, 42, and 43 are illustrated in FIG. 8 and have essentially the same waveforms as the currents in three phase lines 12, 13, and 14 illustrated in FIG. 5. When these currents are applied to corresponding resistors 61, 62, and 63, the voltages shown in FIG. 9 result. Applying these voltages to sensing rectifier 45 results in the currents shown in FIG. 10 flowing through the three rectifier branches 46, 47, and 48. After filtering, the current and return current flows are illustrated in FIG. 11. As mentioned previously, by correctly selecting current transformers 41, 42, and 43, and by the proper selection of resistors 61, 62, 63, 66, 74, and 75, the resulting outputs from differential amplifier 73 will be zero for a normally operating AC to DC converter 10.

Figure 12:
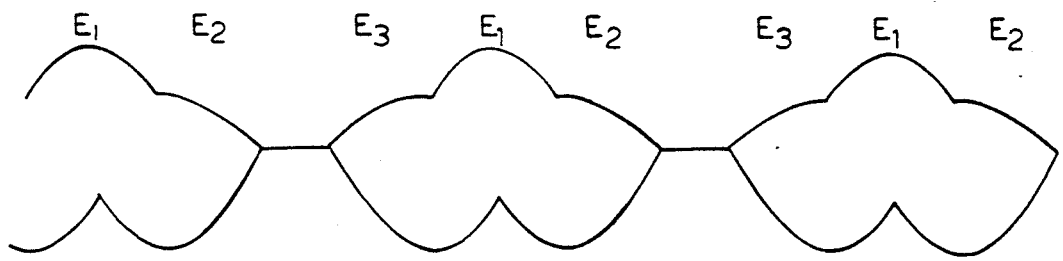
Figure 13:
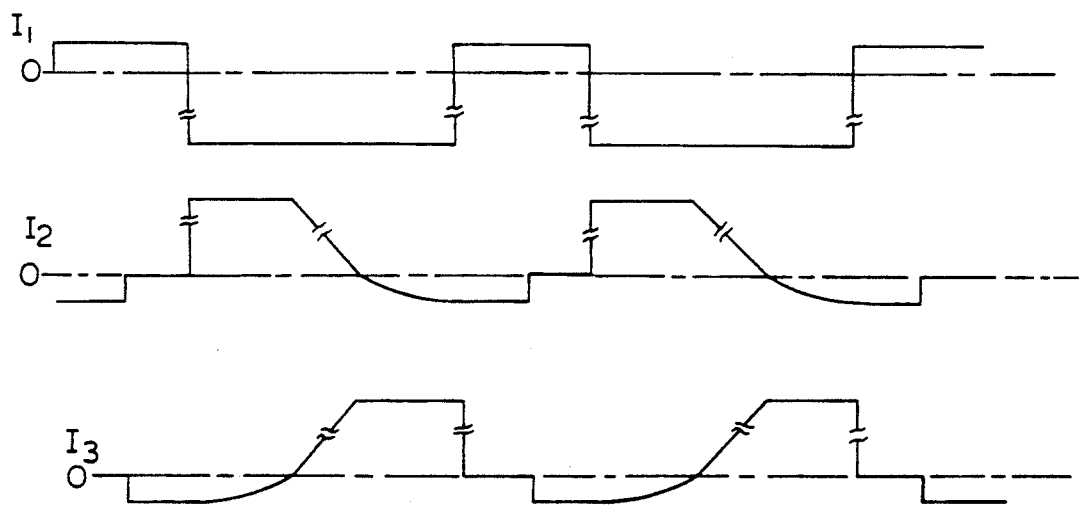
Figure 14:
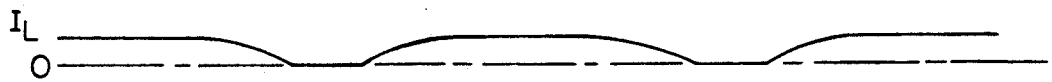
Figure 15:
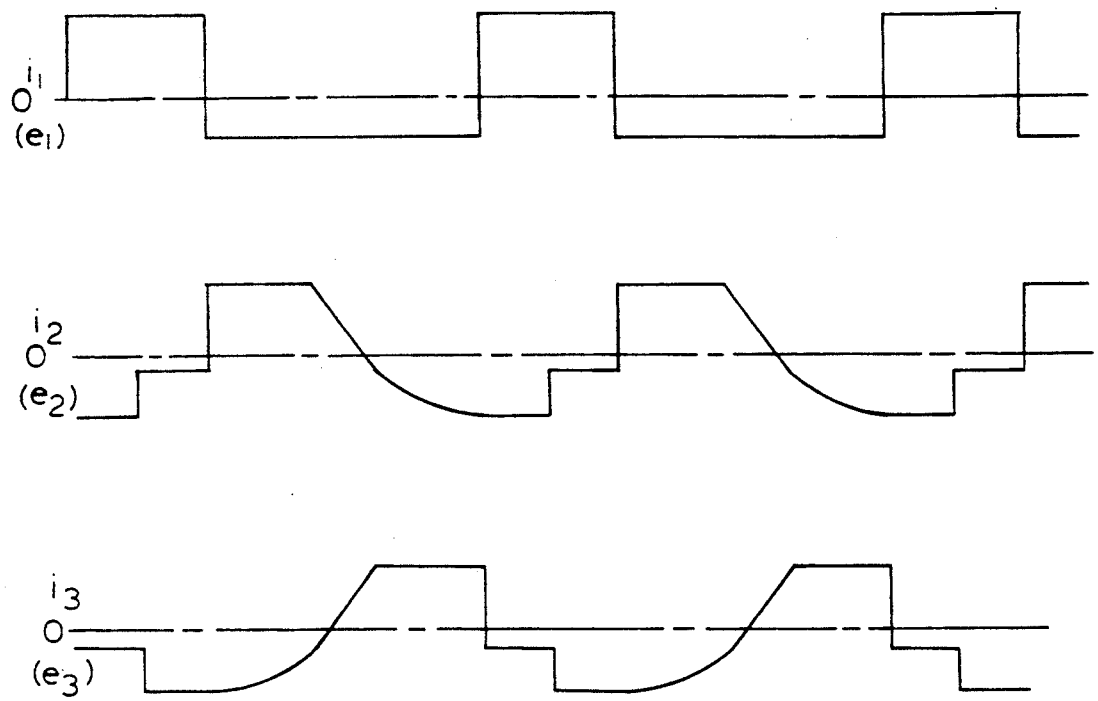
Figure 16:
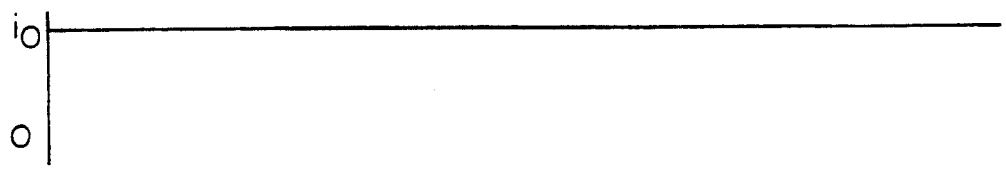

If a fault occurs, however, such as a shorted rectifier in the AC to DC converter, the waveforms as illustrated in FIGS. 4-11 will change. For purposes of illustration, if rectifier 18 becomes shorted, the waveforms shown in FIGS. 12-16 will result. Thus, the voltages on the three phase lines 12, 13, and 14 will be distorted in a manner similar to that shown in FIG. 12 and the currents flowing through these three phase lines 12, 13, and 14 will appear as shown in FIG. 13. The interrupted lines as shown in FIG. 13 indicate the presence of a short circuit current. This short circuit current is not present in the output current $I_L$, shown in FIG. 14, which instead has a waveform determined by the voltage waveforms shown in FIG. 12. The currents in three phase lines 12, 13, and 14 have large values of DC in the presence of a shorted diode in AC to DC converter 10. Current transformers 41, 42, and 43 must be selected so that they do not saturate in the presence of this large value of DC in the currents of three phase lines 12, 13, and 14. Accordingly, the short circuit components of the current in these lines will appear as shown in FIG. 15 in the current transformers and hence, the output current is from AC sensor 40 will be quite large. Since the output current $i_o$ from AC sensor 40 contains this short circuit current but since the output from DC sensor 13 does not, or at least it does not to the same extent as it appears in the output current from AC sensor 40, the inputs to differential amplifier 73 will not be equal and the output from differential amplifier 73 will not be zero. The nonzero output from differential amplifier 73 can be used to provide an indication of a fault and/or operate contactor 34 to disrupt current flow to DC loads 37.

What is claimed is:

1. A system for detecting faults comprising:
   AC lines for carrying AC;
   converting means for converting said AC into DC, said converting means having input means connected to said AC lines for receiving said AC and having an output DC lines for carrying said DC;
   first means coupled to said AC lines for providing a first voltage dependent upon said AC;
   second means coupled to said output DC lines of said converting means for providing a second voltage dependent upon said DC; and
   comparing means for comparing said first and second voltages, for providing a non-fault signal when said first and second voltages are substantially equal, and for providing a fault signal when said first and second voltages are not substantially equal.

2. The system of claim 1 wherein said first means comprises a first sensor means for providing a first sensor signal dependent upon said AC, said first sensor signal having positive and negative values, said first means further comprising first difference means connected to said first sensing means for providing said first voltage based upon the difference between said positive and negative values of said first sensor signal.

3. The system of claim 2 wherein said second means comprises second sensing means for providing a second sensor signal having positive and negative values dependent upon said DC, said second means further comprising second difference means coupled to said second sensing means for providing said second voltage based upon a difference between said positive and negative values of said second sensor signal.

4. The system of claim 3 wherein said comparing means comprises third difference means coupled to said first and second difference means for providing said fault and non-fault signals based upon a comparison between first and second voltages.

5. The system of claim 4 wherein said first difference means comprises a first differential amplifier having a positive input connected to said first sensing means for receiving said positive value of said first sensor signal, having a negative input connected to said first sensing means for receiving said negative value of said first sensor signal, and having an output means for providing said first voltage representing said positive value of said first sensor signal less said negative value of said first sensor signal, wherein said second difference means comprises a second differential amplifier having a positive input connected to said second sensing means for receiving said positive value of said second sensor signal, having a negative input connected to said second sensing means for receiving said negative value of said second sensor signal, and having an output means for providing said second voltage as a function of said positive value of said second sensor signal less said negative value of said second sensor signal, and wherein said third difference means comprises a third differential amplifier having a positive input connected to said output means of said second differential amplifier for receiving said second voltage, having a negative input connected to said output means of said first differential amplifier for receiving said first voltage, and having an output means for providing said fault and non-fault signals as a function of said second voltage less said first voltage.

6. The system of claim 1 wherein said AC lines includes first, second and third AC lines for carrying first, second and third phases of AC, wherein said converting means is arranged for converting said three phases of AC into said DC, wherein said first means provides said first voltage as a first DC voltage based upon said three phases of AC, and wherein said second means provides said second voltage as a second DC voltage.

7. The system of claim 6 wherein said converting means comprises a first converter rectifier branch connected to said first line for rectifying said first phase of said three phases of AC, a second converter rectifier branch connected to said second line for rectifying said second phase of said three phases of AC, and a third converter rectifier branch connected to said third line for rectifying said third phase of said three phases of AC, and wherein said first means comprises a first sensor rectifier branch coupled to said first line for providing a first phase rectified AC sensor signal, a second sensor rectifier branch coupled to said second line for providing a second phase rectified AC sensor signal, a third sensor rectifier branch coupled to said third line for providing a third phase rectified AC sensor signal, and combining means connected to said first, second and third sensor rectifier branches for combining said first, second and third phase rectified AC sensor signals into a first sensor signal having positive and negative DC values dependent upon said three phases of AC.

8. The system of claim 7 wherein said combining means further comprises first difference means for providing said first DC voltage based upon the difference between said positive and negative values of said first sensor signal.

9. The system of claim 8 wherein said second means comprises DC sensing means for providing a second sensor signal having positive and negative DC values dependent upon said DC, said second means further comprising second difference means coupled to said DC sensing means for providing said second DC voltage based upon a difference between said positive and negative values of said second sensor signal.

10. The system of claim 9 wherein said comparing means comprises third difference means coupled to said first and second difference means for providing said fault and non-fault signals based upon a comparison between first and second DC voltages.

11. The system of claim 10 wherein said first difference means comprises a first differential amplifier having a positive input connected to receive said positive DC value of said first sensor signal, having a negative input connected to receive said negative DC value of said first sensor signal, and having an output means for providing said first DC voltage representing said positive DC value of said first sensor signal less said negative DC value of said first sensor signal, wherein said second difference means comprises a second differential amplifier having a positive input connected to said DC sensing means for receiving said positive DC value of said second sensor signal, having a negative input connected to said DC sensing means for receiving said negative DC value of said second sensor signal, and having an output means for providing said second DC voltage as a function of said positive value of said second sensor signal less said negative value of said second sensor signal, and wherein said third difference means comprises a third differential amplifier having a positive input connected to said output means of said second differential amplifier for receiving said second DC voltage, having a negative input connected to said output means of said first differential amplifier for receiving said first DC voltage, and having an output means for providing said fault and non-fault signals as a function of said second DC voltage less said first DC voltage.

12. A system for detecting faults represented by a difference between a first DC voltage representing an AC signal and as second DC voltage representing a DC signal, said system comprising:
   AC lines for carrying said AC signal;
   DC lines for carrying said DC signal;
   first means coupled to said AC lines for providing said first DC voltage based upon said AC signal;
   second sensing means coupled to said DC lines for providing said second DC voltage based upon said DC signal; and
   fault detecting means coupled to said first sensing means and to said second sensing means for providing a fault signal when said first and second DC voltages are not substantially equal and for providing a non-fault signal when said first and second DC voltages are substantially equal.

13. The system of claim 12 wherein said first means comprises a first sensor means for providing a first sensor signal dependent upon said AC signal, said first sensor signal having positive and negative values, said first means further comprising first difference means connected to said first sensing means for providing said first DC voltage based upon the difference between said positive and negative values of said first sensor signal.

14. The system of claim 13 wherein said second means comprises second sensing means for providing a second sensor signal having positive and negative values dependent upon said DC signal, said second means further comprising second difference means coupled to said second sensing means for providing said second DC voltage based upon a difference between said positive and negative values of said second sensor signal.

15. The system of claim 14 wherein said fault detecting means comprises third difference means coupled to said first and second difference means for providing said fault and non-fault signals based upon a comparison between first and second DC voltages.

16. The system of claim 15 wherein said first difference means comprises a first differential amplifier having a positive input connected to said first sensing means for receiving said positive value of said first sensor signal, having a negative input connected to said first sensing means for receiving said negative value of said first sensor signal, and having an output means for providing said first DC voltage as a function of said positive value of said first sensor signal less said negative value of said first sensor signal, wherein said second difference means comprises a second differential amplifier having a positive input connected to said second sensing means for receiving said positive value of said second sensor signal, having a negative input connected to said second sensing means for receiving said negative value of said second sensor signal, and having an output means for providing said second DC voltage as a function of said positive value of said second sensor signal less said negative value of said second sensor signal, and wherein said third difference means comprises a third differential amplifier having a positive input connected to said output means of said second differential amplifier for receiving said second DC voltage, having a negative input connected to said output means of said first differential amplifier for receiving said first DC voltage, and having an output means for providing said fault and non-fault signals as a function of said second DC voltage less said first DC voltage.

17. A system for converting AC into DC and for detecting faults comprising:
   converter means having an input for receiving AC and an output for supplying DC, said converter means for converting said AC into said DC;
   first sensing means coupled to said input of said converting means for providing an AC sensor signal based upon said AC, said AC sensor signal having positive and negative values;
   first difference means coupled to said first sensing means for providing a first difference signal based upon a difference between said positive and negative values of said AC sensor signal;
   second sensing means coupled to said output of said converting means for providing a DC sensor signal based upon said DC, said DC sensor signal having positive and negative values;
   second difference means coupled to said second sensing means for providing a second difference signal based upon a difference between said positive and negative values of said DC sensor signal; and
   third difference means coupled to said first and second difference means for providing a fault indicating signal based upon a difference between said first and second difference signals.

18. The system of claim 17 wherein said first difference means comprises a first differential amplifier having a positive input connected to said AC sensing means for receiving said positive value of said AC sensor signal, having a negative input connected to said AC sensing means for receiving said negative value of said AC sensor signal, and having an output means for providing said first difference signal representing said positive value of said AC sensor signal less said negative value of said AC sensor signal, wherein said second difference means comprises a second differential amplifier having a positive input connected to said DC sensing means for receiving said positive value of said DC sensor signal, having a negative input connected to said DC sensing means for receiving said negative value of said DC sensor signal, and having an output means for providing said second difference signal as a function of said positive value of said DC sensor signal less said negative value of said DC sensor signal, and wherein said third difference means comprises a third differential amplifier having a positive input connected to said second differential amplifier for receiving said second difference signal, having a negative input connected to said first differential amplifier for receiving said first difference signal, and having an output means for providing said fault indicating signal as a function of said second difference signal less said first difference signal.

* * * * *